United States Patent
Jiang (10) Patent No.: US 9,621,264 B2
(45) Date of Patent: Apr. 11, 2017

(54) BI-DIRECTIONAL TAP-MONITOR FOR OPTICAL ADD-DROP PHOTONIC CHIP

(71) Applicant: Jia Jiang, Kanata (CA)

(72) Inventor: Jia Jiang, Kanata (CA)

(73) Assignee: Huawei Technologies Co., Ltd., Shenzhen, Guangdon (CN)

( * ) Notice: Subject to any disclaimer, the term of this patent is extended or adjusted under 35 U.S.C. 154(b) by 141 days.

(21) Appl. No.: 14/608,874

(22) Filed: Jan. 29, 2015

(65) Prior Publication Data
US 2016/0226581 A1    Aug. 4, 2016

(51) Int. Cl.
*G02B 6/26* (2006.01)
*G02B 6/28* (2006.01)
(Continued)

(52) U.S. Cl.
CPC ..... *H04B 10/07955* (2013.01); *G02B 6/4286* (2013.01); *G02B 6/4287* (2013.01); *H04B 10/801* (2013.01); *H04Q 11/00* (2013.01)

(58) Field of Classification Search
CPC ........................... G02B 6/4286; G02B 6/4287
See application file for complete search history.

(56) References Cited

U.S. PATENT DOCUMENTS 4,810,052 A * 3/1989 Fling ................. G02B 6/24
                                                        385/24
6,701,049 B1 * 3/2004 Awad ................ G02F 1/3519
                                                        385/122
(Continued)

FOREIGN PATENT DOCUMENTS

CN    101644794    2/2010
CN    101755403    6/2010
(Continued)

OTHER PUBLICATIONS

Translation of Abstract of Chinese reference 101644794 (Univ. Peking).
(Continued)

*Primary Examiner* — Michelle R Connelly
(74) *Attorney, Agent, or Firm* — Gowling WLG (Canada) LLP (57) ABSTRACT

A bidirectional optical tap-monitor is described for detecting an optical signal power carried by a through waveguide. The tap-monitor comprises a tap waveguide placed near the through waveguide, and a single waveguide-type photodetector for detecting a fraction of the optical signal power coupled from the tap waveguide. The tap waveguide includes two ports at opposite ends of the tap waveguide and the waveguide-type photodetector includes two ports that are connected respectively to the two ports of the tap waveguide. When light travels through the through waveguide in one direction, the coupled fraction of the optical signal power is fed to the photodetector via one of the two ports of the tap waveguide, and when light travels through the through waveguide in the opposite direction, the coupled fraction of the optical signal power is fed to the photodetector via the other one of the two ports of the tap waveguide. The bidirectional optical tap-monitor is operable in either a forward-propagating or a backward-propagating direction.

13 Claims, 5 Drawing Sheets

(51) Int. Cl.
*G02B 6/42* (2006.01)
*H04B 10/079* (2013.01)
*H04B 10/80* (2013.01)
*H04Q 11/00* (2006.01)

(56) References Cited

U.S. PATENT DOCUMENTS

| | | | |
|---|---|---|---|
| 2003/0174962 A1* | 9/2003 | Poole | G02B 6/2852 385/48 |
| 2004/0208584 A1* | 10/2004 | Keller | G02B 6/29383 398/88 |
| 2007/0047875 A1* | 3/2007 | Sezerman | H04B 10/0795 385/48 |
| 2008/0240712 A1 | 10/2008 | Hinderthur | |
| 2010/0166370 A1* | 7/2010 | Cody | G02B 6/4475 385/48 |
| 2010/0247036 A1 | 9/2010 | Little | |
| 2011/0091155 A1* | 4/2011 | Yilmaz | G02B 6/4207 385/30 |
| 2015/0318927 A1* | 11/2015 | Gill | G02F 1/225 398/186 |

FOREIGN PATENT DOCUMENTS

| | | |
|---|---|---|
| EP | 0762672 | 3/1997 |
| WO | 2013190804 | 12/2013 |

OTHER PUBLICATIONS

Abstract of US2009016716 (A1) corresponding to Chinese reference 101755403 (A) (AIDI Corp).
International Search Report of corresponding international application No. PCT/CN2016/070056 dated Mar. 24, 2016.
Translation of Abstract of European Reference 0762672 (Alcatel N. V.).

* cited by examiner

BI-DIRECTIONAL TAP-MONITOR FOR OPTICAL ADD-DROP PHOTONIC CHIP

TECHNICAL FIELD

The present invention relates to optical add-drop photonic chip designs and implementations, and, in particular, to optical tap-monitors for add-drop photonic chips.

BACKGROUND

An optical transponder aggregator is a flexible optical network element for carrying traffic onto and off an optical network. Each transmitter Tx or receiver Rx in a transponder aggregator can connect to any one of a plurality of wavelengths, and the transponder aggregator includes photonic switches implementing selections of different wavelengths and setting the connection pattern. A transponder aggregator typically includes two optical waveguide modules, a drop switch module and an add switch module.

To minimize costs and chip sizes, the switch modules can be implemented as photonic integrated circuits (PIC), typically silicon photonics. Due to the number of channels existing in the entire optical band and the size of the PIC chip, existing PIC chips do not have broad band operating capability and current solutions involve implementing different sub-bands on different chips. As well, in many applications it is desirable to separate the drop switch module and add switch module into different chips, due to yield or chip size limitations, or because operators prefer to assemble the networks using separate add switch and drop switch. These are all factors that contribute to circuit, manufacturing and packaging complexity.

Accordingly, while transponder aggregators offer great operational flexibility, there is a need to simplify photonic chip designs for manufacturing and to bring down the costs for market implementations.

SUMMARY

The following presents a summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

One inventive aspect of the disclosure is a bidirectional optical tap-monitor for detecting an optical signal power carried by a through waveguide. The bidirectional optical tap-monitor includes a tap waveguide placed near the through waveguide for coupling a fraction of the optical signal power carried by the through waveguide, and a single waveguide-type photodetector for detecting the coupled fraction of the optical signal power. The tap waveguide includes two ports at opposite ends of the tap waveguide and the waveguide-type photodetector includes two ports that are connected respectively to the two ports of the tap waveguide. When light travels through the through waveguide in one direction, the coupled fraction of the optical signal power is fed to the photodetector via one of the two ports of the tap waveguide, and when light travels through the through waveguide in the opposite direction, the coupled fraction of the optical signal power is fed to the photodetector via the other one of the two ports of the tap waveguide.

Another inventive aspect of the disclosure is an add-drop photonic chip configurable between an add role and a drop role for a transponder aggregator. The add-drop photonic chip includes a plurality of photonic switch cells for collectively implementing switching functions for either an add transponder aggregator or a drop transponder aggregator, and a plurality of bidirectional tap-monitors for control of the plurality of photonic switch cells. The bidirectional tap-monitors each includes a tap waveguide for coupling a fraction of an optical signal power carried by a through waveguide, and a single waveguide-type photodetector for detecting the coupled fraction of the optical signal power. The tap waveguide includes two ports at opposite ends of the tap waveguide and the waveguide-type photodetector includes two ports that are connected respectively to the two ports of the tap waveguide. When the plurality of photonic switch cells collectively implement switching functions for the add transponder aggregator, the coupled fraction of the optical signal power is fed to the photodetector via one of the two ports of the tap waveguide, and when the plurality of photonic switch cells collectively implement switching functions for the drop transponder aggregator, the coupled fraction of the optical signal power is fed to the photodetector via the other one of the two ports of the tap waveguide.

BRIEF DESCRIPTION OF THE DRAWINGS

These and other features of the disclosure will become more apparent from the description in which reference is made to the following appended drawings.

DETAILED DESCRIPTION

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the exemplary designs and implementations illustrated and described herein, but may be modified within the scope of the appended claims along with their full scope of equivalents.

An optical transponder aggregator is described hereinafter which is an optical apparatus that generally includes a drop transponder aggregator (also "receiver aggregator") for carrying traffic off a network (also "drop role"), and an add transponder aggregator (also "transmitter aggregator") for carrying traffic onto the network (also "add role"). The drop transponder aggregator includes a drop switch module; and the add transponder aggregator includes an add switch module. As will become apparent and depending on the context, the term "transponder aggregator" may refer to either a drop or add transponder aggregator, or both aggregators. For the purposes of this specification, the optical transponder aggregator may or may not include an optical demultiplexer or multiplexer.

In various embodiments which follow, each add or drop switch module includes one or more photonic switches and one or more tap-monitors implemented on a photonic integrated circuit (PIC). Each add or drop switch module includes optical waveguides constructing the photonic switch cells and tap-monitors, typically by way of silicon photonics or other waveguide material systems such as GaAs, InP, LiNbO3, PLZT, SiN, SiON.

In a typical but non-limiting structure of the optical waveguide, a silicon core with high refractive index is surrounded by a low refractive index material, for example silicon dioxide. This structure forms an optical waveguide, used at communications wavelengths such as the 1310 nm or 1550 nm bands, wavelengths for which the silicon and silicon dioxide are transparent. Typical silicon PIC chips use a lithographically-defined layout of single mode and multi-mode waveguide elements, the whole forming a photonic circuit.

For Si photonics, Ge or SiGe photodetectors (all of which are group IV semiconductors) can be used for the tap-monitors. For GaAs photonics and InP photonics (III-V semiconductors), InGaAs or a similar III-V semiconductor material photodetectors can be used for the tap-monitors. For non-semiconductor photonics, such as LiNbO3, PLZT, SiN, SiON, the photodetectors can be Ge, SiGe or InGas (or III-V materials similar to InGaAs) photodetectors.

According to various embodiments, a bidirectional optical tap-monitor is provided that is operable in either a forward-propagating or backward-propagating direction. The tap-monitor includes a tap waveguide placed near a through waveguide to couple a fraction of the optical signal power carried by the through waveguide and a single waveguide-type photodetector to detect the fraction of the optical signal power coupled from the tap waveguide. The tap waveguide includes two ports at opposite ends of said tap waveguide and the waveguide-type photodetector includes two ports that are connected respectively to the two ports of said tap waveguide. When light travels through the through waveguide in one direction, the coupled fraction of the optical signal power is fed to the photodetector via one of the two ports of the tap waveguide, and when light travels through the through waveguide in the opposite direction, the coupled fraction of the optical signal power is fed to the photodetector via the other one of the two ports of the tap waveguide.

In the following description, the add switch module may be referred to as "add switch", or "PIC performing add role"; and the drop switch module may be referred to as "drop switch", or "PIC performing drop role". The add switch and the drop switch may be implemented on the same PIC chip or on separate chips.

According to various embodiments, a photonic chip for transponder aggregator is provided that shares the same chip schematic for the add transponder aggregator and the drop transponder aggregator. More specifically, an add-drop photonic chip is provided that shares the same chip schematic for the add switch and the drop switch. If the product requirements call for separate chips to implement the add switch and the drop switch, only one manufacturing run can be used to build both chips. Alternatively, if the product requirements call for one single die containing both the add switch and the drop switch, the same design can be duplicated on the die with reduced design efforts.

In either scenario, an add-drop photonic chip is provided that is configurable to implement the add role or drop role for a transponder aggregator and can be used in either direction. In one direction the add-drop photonic chip or part of the chip can be used for the add role and in the opposite direction the add-drop photonic chip or the same part of the chip can be used for the drop role. According to various embodiments, the add-drop photonic chip includes a plurality of photonic switch cells for collectively implementing switching functions for either the add role or drop role and a plurality of bi-directional optical tap-monitors for control of the plurality of photonic switch cells. When the plurality of photonic switch cells collectively implement switching functions for the add role, the coupled fraction of the optical signal power is fed to the photodetector via one of the two ports of the tap waveguide, and when the plurality of photonic switch cells collectively implement switching functions for the drop role, the coupled fraction of the optical signal power is fed to the photodetector via the other one of the two ports of the tap waveguide The photonic chips as designed can be used in various optical networks, such as in a Wavelength-Division Multiplexing (WDM) or other optical edge or core metro area network (MAN), a Passive Optical Network (PON), a wireless aggregation network or cloud radio access network (C-RAN), or the like. While some embodiments make reference to a ring structure network, it should be understood that the photonic chips apply to other network structures, such as a linear structure network.

Figure 1:
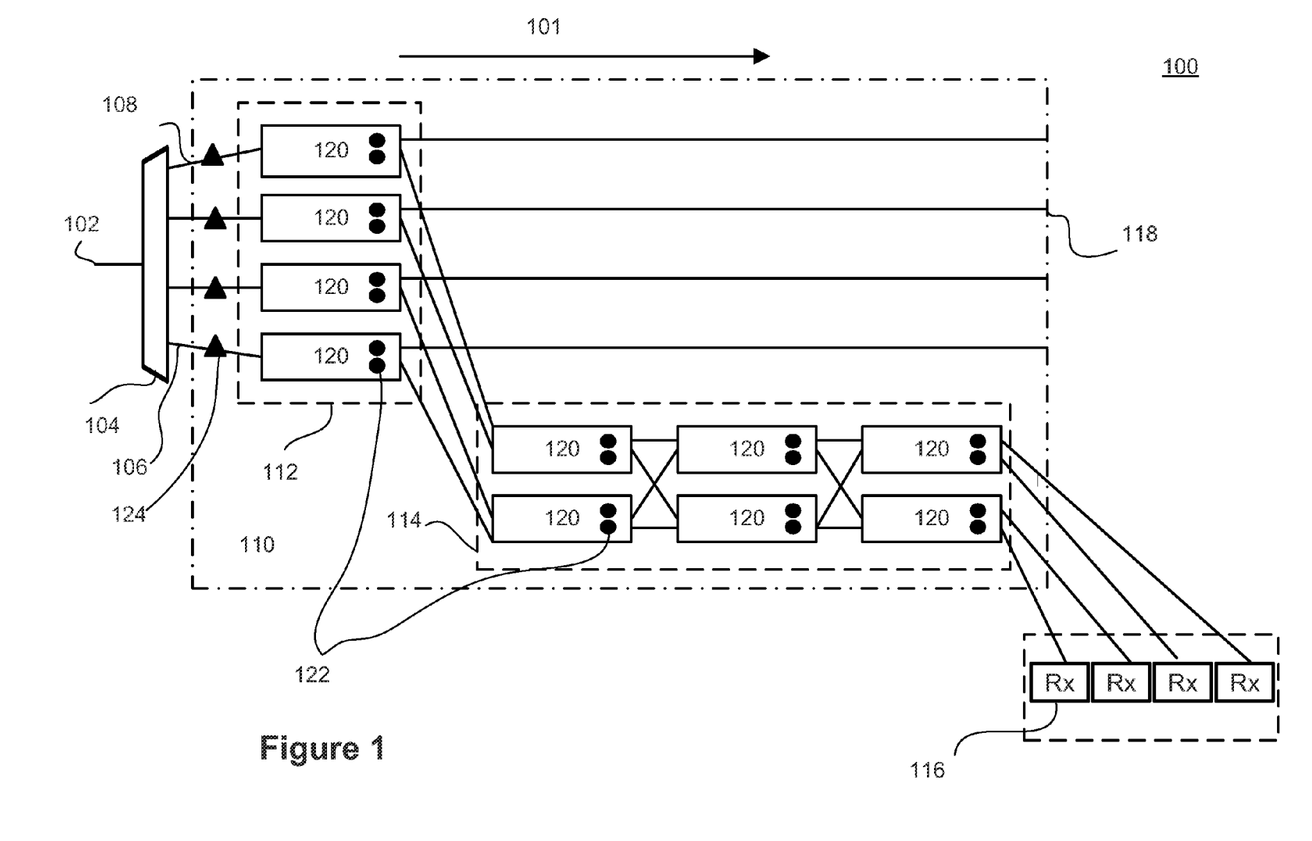
FIG. 1 provides a circuit diagram illustrating a drop transponder aggregator, according to one embodiment of the present invention.

FIG. 1 presents a circuit diagram of a drop transponder aggregator 100, according to one embodiment of the present invention. In the embodiment illustrated in FIG. 1, light travels from the left to the right in direction 101 for the drop role.

As illustrated by way of example in FIG. 1, an input line fiber 102, such as a Dense Wavelength-Division Multiplexing (DWDM) input line fiber, is connected to an optical demultiplexer 104. The input line fiber 102 carries a group of optical line signals travelling on different wavelengths and the demultiplexer 104 splits the signals onto separate fibers 106 for individual wavelengths. The fibers 106 are connected to optical line input ports 108 of a drop switch 110. The drop switch 110 is implemented as a PIC and includes a drop selector switch 112 and a receiver aggregator switch 114, which collectively implements the switching functions for the drop transponder aggregator 100. The drop selector switch 112 selects a subset of the incoming line signals to the receiver aggregator switch 114, which in turn switches the signals to banks of client receivers Rx 116. The balance of the incoming line signals are passed as optical transit signals via optical transit output ports 118 of the PIC. The optical transit output ports 118 may be connected to an add switch. Some of the transit lines to the add switch may be unoccupied (unused). Each client receiver Rx 116 may be wavelength-agnostic, or tuned to the wavelength that it will receive.

Figure 2:
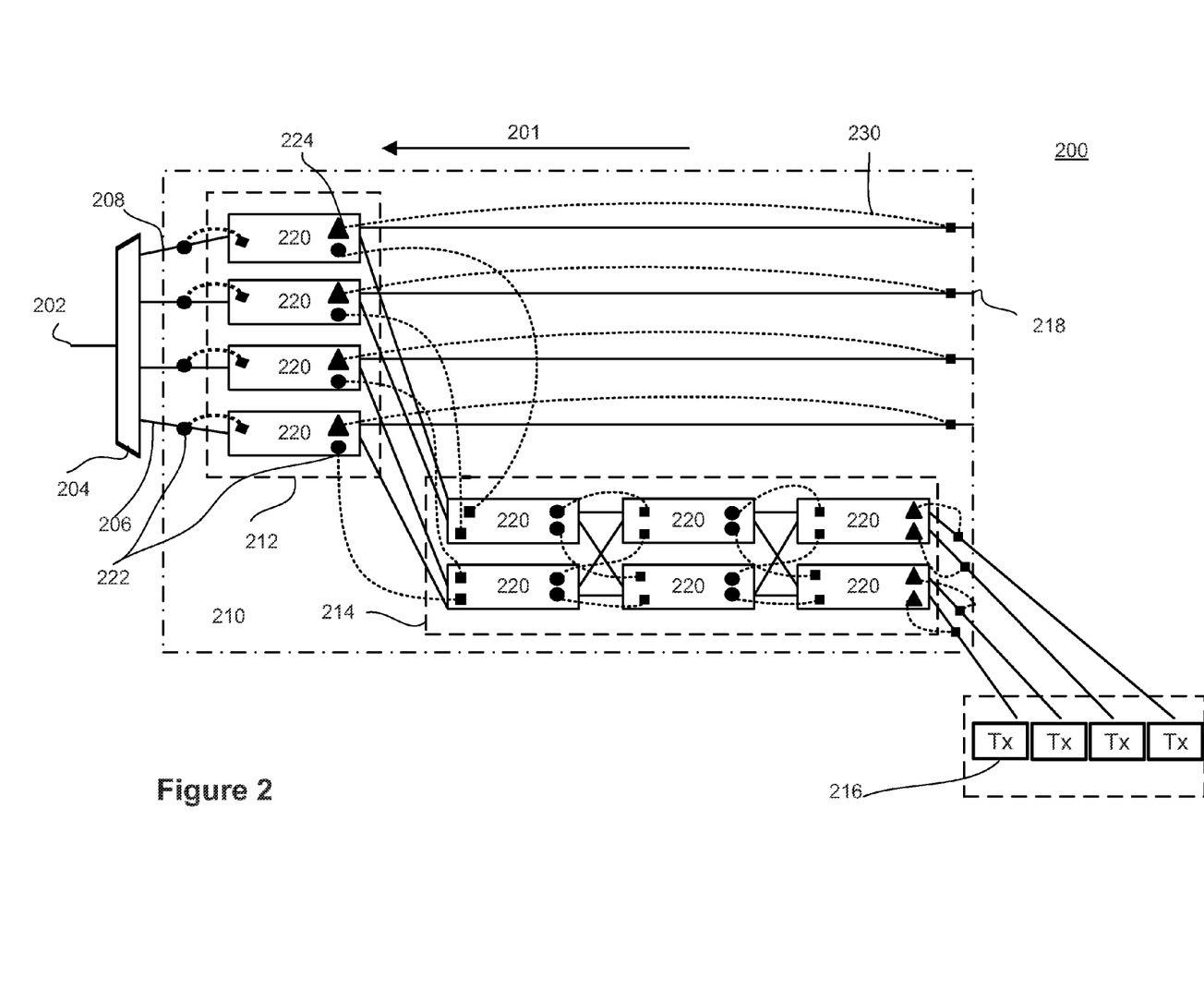
FIG. 2 provides a circuit diagram illustrating an add transponder aggregator according to one embodiment of the present invention.

FIG. 2 presents a circuit diagram of an add transponder aggregator 200 corresponding to the drop transponder aggregator 100, according to the embodiment. As illustrated in this figure, the add transponder aggregator 200 has the same chip schematic as the drop transponder aggregator 100. As well, an add switch 210, also implemented as a PIC, has a common chip schematic as the drop switch 110 in FIG. 1. When performing the add role, light propagates through the add transponder aggregator 200 in an opposite direction 201 compared to the drop transponder aggregator 100.

In the embodiment depicted by way of example in FIG. 2, optical transit signals enter the add switch 210 through optical transit input ports 218 where the optical transit input ports 218 may be connected to a drop switch, such as the drop switch 110. The add switch 210 includes a transmitter aggregator switch 214 and an add selector switch 212, which collectively implements the switching functions for the add transponder aggregator 200. The transmitter aggregator switch 214 selects from client transmitters Tx 216 a subset of signals on wavelengths unoccupied by the optical transit signals and the add selector switch 212 connects the optical transit signals, plus the selected subset of signals from client transmitters Tx 216, to optical line output ports 208. The optical line output ports 208 are connected to individual output fibers 206 of different waveguides and an optical multiplexer 204 multiplexes the signals from the optical output ports 208 onto an output line fiber 202, such as a DWDM output line fiber. Each client transmitter Tx 216 may be wavelength-agile, or tuned to the wavelength that it will occupy.

While the embodiment shown in FIGS. 1 and 2 illustrates a small number of input and outputs for purposes of illustration, it should be understood that Rx, Tx, input ports, output ports, and the wavelengths that they carry are not limited to specific numbers and may be equal in some applications or not equal in other applications. As well, while a simple switch matrix or suitable combination of switch matrices is depicted in FIGS. 1 and 2 to explain the switching functions, any type of switch matrixes may be used. In a typical product, 10 to 64 input/output ports may be implemented. While FIGS. 1 and 2 illustrate the drop transponder aggregator 100 and the add transponder aggregator 200 as separate circuits, it should be understood that the two circuits may be implemented on a single die depending on product requirements.

Both drop switch 110 and add switch 210 include photonic switches comprising optical waveguides that implement photonic switch cells and optical tap-monitors.

Referring to FIGS. 1 and 2, each add-drop switch 110, 210 comprises a number of photonic switch cells 120, 220. The plurality of switch cells 120, 220 collectively implements switching functions of either an add role or a drop role for a transponder aggregator. The switch cells 120, 220 may be 2×2 switch cells, each of which being used as 1×2, 2×2 or 2×1 switching functionality depending on their respective roles in the switch; or may be 1×2, 2×2 or 2×1 switch cells, each of which implementing their respective 1×2, 2×2 or 2×1 switching functionalities.

According to some embodiments, the switching function of each switch cell 120, 220 may be realized by a Mach-Zehnder interferometer, containing one or more adjustable phase shifters that are adjustable by means of a switch cell control circuit. Alternatively, the switching function of each of the switch cells 120, 220 may be implemented as a ring resonator interferometer element, splitter plus electro-absorption electro-gain element or any other electrically driven element that can direct light to one of two output ports.

According to various embodiments, each add-drop switch 110, 210 also includes a number of tap-monitors 122, 124, 222, 224. Each tap-monitor 122, 124, 222, 224 comprises an optical tap in the form of a tap waveguide that taps a small fraction of the optical signal power and a photodetector to detect the tapped optical signal power. The tap-monitor 122, 124, 222, 224 may also include a transimpedance amplifier. The output of the photodetector or the transimpedance amplifier may be connected to a receiver circuit to measure the photocurrent or voltage thereby providing a relative indication of the magnitude of the optical signal power. Because tap-monitors usually occupy significant space on the chip, decrease the optical signal power (by tapping some light), and generate heat (mostly in the control circuit), it is desirable to minimize the number of tap-monitors. As well, the input power of each switch cell is generally not monitored.

The switching functions themselves are symmetric for the add switch and drop switch. For example, the switching functions can be reversed to make an add switch by operating inputs of a drop switch as outputs, and outputs as inputs. However, in conventional designs, the circuits for an add switch and for a drop switch are not the same because the structure and arrangement of tap-monitors in the add-drop switch break the symmetry. Accordingly, different chip schematics are used for add and drop switches which in turn doubles the cost of spares and the cost of manufacturing inventory, compared to a solution where the designs for the add switch and drop switch are identical.

In conventional designs, a tap-monitor has directionality. For example, the tap-monitor usually includes an optical tap, such as a directional coupler, constructed by a tap waveguide placed near a through waveguide. The through path is carried by the through waveguide, and the tap waveguide is placed in the tail of the optical power carried in the through waveguide, and a small amount of optical power is transferred from the through waveguide to the tap waveguide. The tap waveguide includes a forward-facing port and a backward-facing port. Light going in a forward direction along the through waveguide partially couples out of the forward-facing port and is fed into the input of a waveguide photodetector. In conventional designs the backward-facing port of the tap waveguide may be connected to a beam terminator (e.g. an absorbing medium) to avoid back-reflection and stray light, which may degrade optical signal integrity.

According to various embodiments of the present invention, a bi-directional tap-monitor is implemented that is symmetric in a forward direction and in a backward direction. The tap-monitor is referred to as "bi-directional" in the sense that the tap-monitor is operable in either a forward-propagating or backward propagating direction. In other words, the bi-directional tap-monitor has a switchable direction. According to various embodiments, the tap waveguide backward-facing port is connected to the other port (previously-unused) of the same photodetector which is connected to the tap waveguide forward-facing port. The photodetector can be used to detect light signal in either direction.

Figure 3:
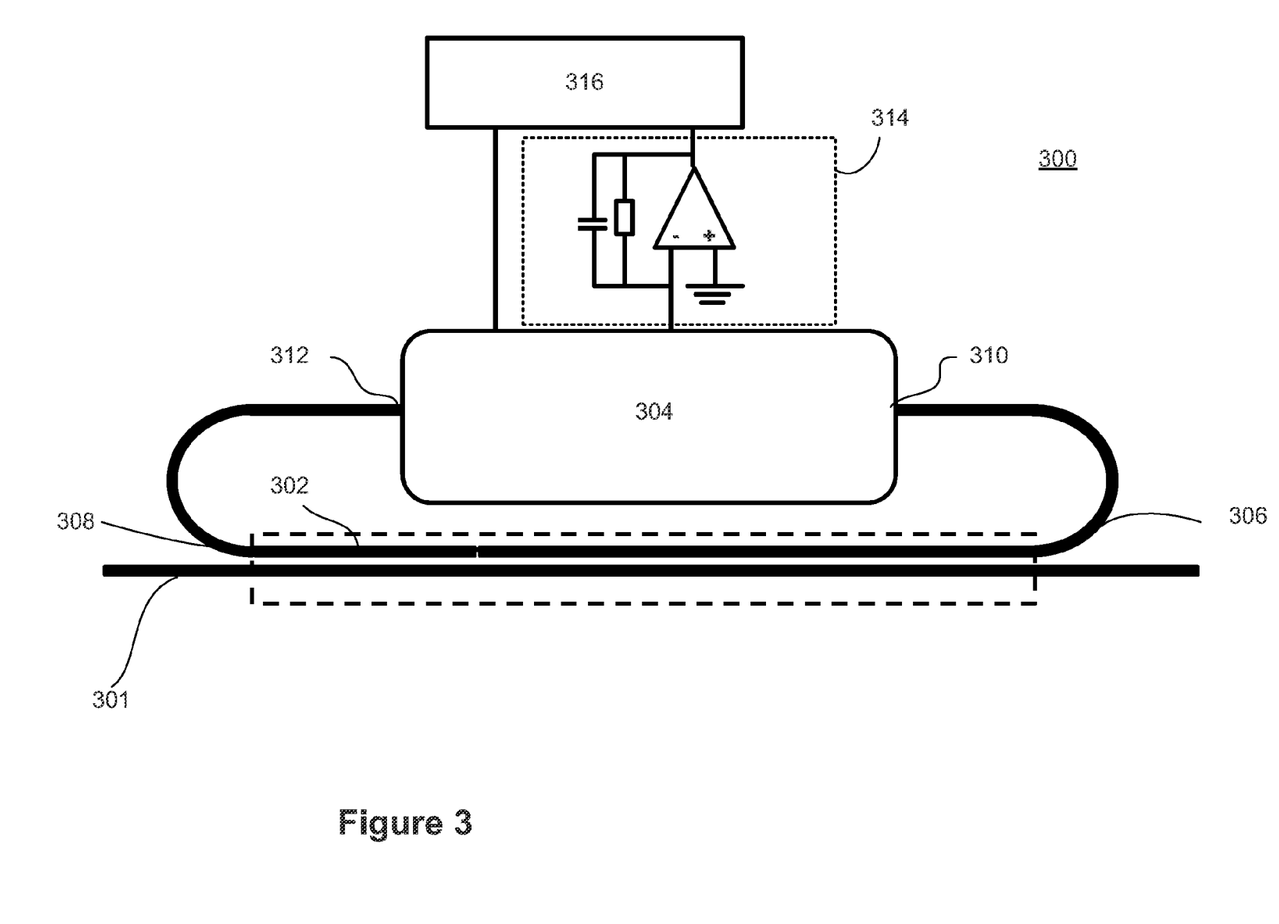
FIG. 3 illustrates a bi-directional tap-monitor according to one embodiment of the present invention.

FIG. 3 illustrates a bi-directional tap-monitor 300 according to one embodiment of the present invention. The tap-monitor 300 is designed to couple a fraction of an optical signal power carried by a through waveguide 301. The tap-monitor 300 comprises an optical tap in the form of a tap waveguide 302, such as a directional coupler, placed near the through waveguide 316 and taps a small fraction or portion (e.g., 1%, 2% or the like) of the optical signal power carried by the through waveguide 301. The tap-monitor 300 also includes a waveguide-type photodetector 304 connected to the tap waveguide 302 to detect the tapped fraction of the optical signal power. As illustrated in FIG. 3, The tap waveguide 302 includes two ports 306, 308 at opposite ends of said tap waveguide. The two ports 306, 308 are connected respectively to two ports 310, 312 of the photodetector 304. When light travels in one direction via the through waveguide 301 (from left to right in the embodiment of FIG. 3), the light is coupled out of the tap waveguide 302 via port 306 and enters the photodetector 304 via port 310. Conversely, when light travels in the opposite direction (from right to left in the embodiment of FIG. 3), the light is coupled out of the tap waveguide 302 via port 308 and enters the photodetector 304 via port 312. As such, the tap-monitor 300 responds to both the forward-propagating light and the backward-propagating light and the photodetector 304 detects the tapped fraction of the optical signal power in either direction. The photodetector 304 may further be connected to a transimpedance amplifier 314. The output of the photodetector 304 or the transimpedance amplifier 314 may be connected to an electrical circuit 316 to measure the photocurrent or voltage to provide a relative indication of the magnitude of the optical signal power carried by the through waveguide 301.

While the tap waveguide 302 in this embodiment is provided in the form of a directional coupler with the through waveguide 301, other forms of couplers can be implemented for the purpose of the bi-directional tap monitor 300. While FIG. 3 illustrates a straight through waveguide 301, and waveguides 301, 302 each includes a constant cross-section, of the same size, and with a constant gap between the waveguides 301, 302, one or more of those conditions can be changed depending on the desired performance and manufacturability of the couplers.

Figure 4:
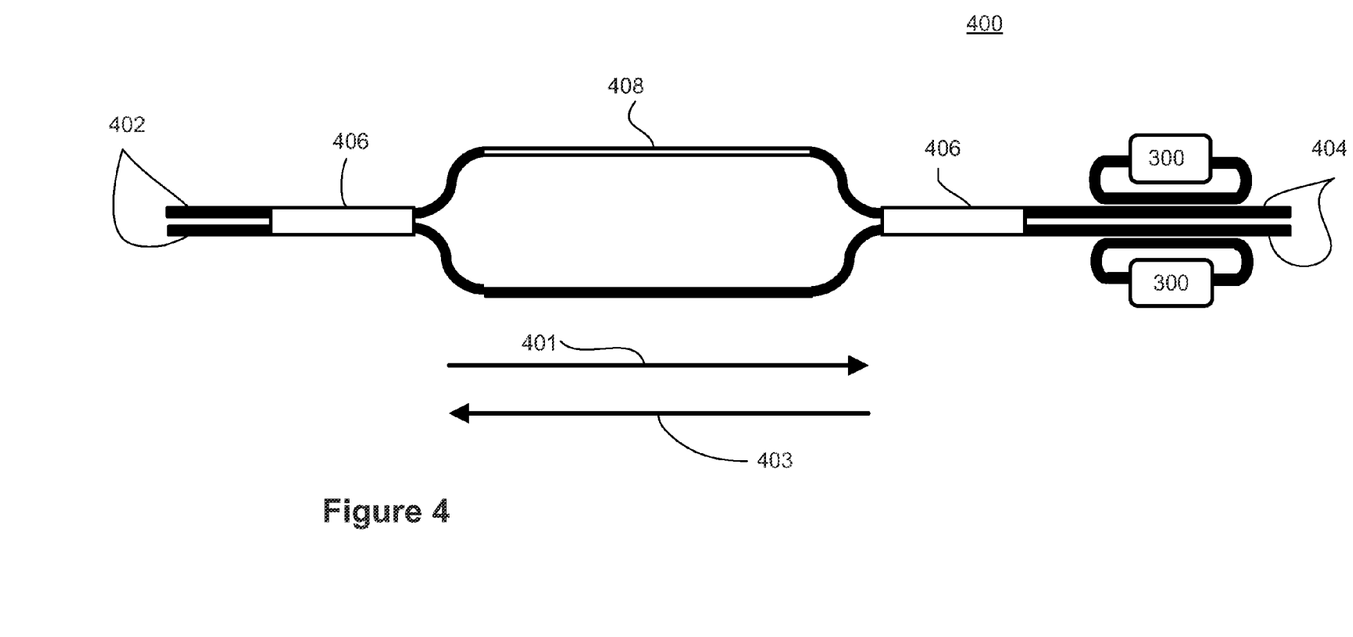
FIG. 4 provides an 2×2 photonic switch cell using the bi-directional tap monitors, according to one embodiment of the present invention.

FIG. 4 depicts a 2×2 photonic switch cell 400 used in connection with the bi-directional tap monitors 300, according to one embodiment of the present invention. The 2×2 photonic switch cell 400 includes two ports 402 on one side and two ports 404 on the other side. When light propagates in a forward direction 401 (from left to right in the embodiment of FIG. 4), ports 402 act as optical inputs and ports 404 act as optical outputs. When light propagates in a backward direction 403 (from right to left in the embodiment of FIG. 4), ports 404 act as optical inputs and ports 404 act as optical outputs. The switch cell 400 may be used in drop role when light propagates one direction, and in add role when light propagates in the opposite direction. The switch cell 400 also includes optical splitter 406 which forms ends of switching element, e.g, Mach-Zehnder interferometer, and tunable optical phase shifter 408 which actuates switching, i.e. performs a switching function. In this 2×2 photonic switch cell 400, two tap-monitors 300 are provided near ports 404, each responding to both the forward-propagating light and the backward-propagating light, by way of a single waveguide-type photodetector 304.

The waveguide photodetector 304 may be designed to absorb the light so that optical loop parasitic are suppressed. For example, the waveguide photodetector 304 may be configured to have at least 40 dB optical absorption, by e.g., choosing a suitably long length of photodetecting material. If the PIC comprises silicon waveguides, the photodetecting material may be germanium. Because the leakage through the photodetector is small enough that the two ports 306, 308 of the tap waveguide 302 being connected does not cause a significant optical loop, and therefore would not introduce much optical signal integrity penalty.

Also, the bi-directional tap-monitor 300 according to the embodiments would not add any additional loss compared to using two directional tap-monitors, because it makes use of the optical tap currently used in the switch cell design and realizes the switchability of directions by connecting the two ports of the tap waveguide 302 with opposite ends of the photodetector 304.

While FIG. 4 only shows a 2×2 photonic switch cell, it should be appreciated that 1×2 or 2×1 switch cell can be similarly implemented. The unused optical port of the 1×2 or 2×1 switch cell may be terminated to a beam-dump within the switch cell. As well, while tap-monitors 300 are placed near ports 404 in FIG. 4, it should be apparent that the tap-monitors 300 can be placed near ports 402 or at other locations, which may be physically laid out within the switch cell 400, or physically laid out in some other manner.

In this particular embodiment for purposes of illustration, light propagates in a forward direction when the transponder aggregator 100 performs the drop role, and in a backward direction when the transponder aggregator 200 performs the add role. It should however be understood that the correspondence between the direction of light and the role of the aggregator can be reversed. In any event, one of the ports 306, 308 of the tap waveguide 302 is used to couple out light for the add role, while the other one of the ports 306, 308 is used to couple out light for the drop role.

According to various embodiments of the present invention, a plurality of tap-monitors 300 are provided for control of the add-drop switch 110, 210. Each tap-monitor 300 may be used as a switch cell output monitor or an optical input port monitor, depending on its function or role in the add-drop switch 110, 210.

Switch cell output monitors are used to implement closed-loop control of the switch cells 120, 220. Each switch cell 120, 220 includes a switch cell control circuit to adjust the switching function, e.g., adjusting the adjustable phase shifter(s) within the switch cell to achieve a desired maximum or minimum optical signal power on each output port. Thus, the switch cells 120, 220 can be used as a space switch, to direct light in a desired lightpath through the switch circuit. A switch cell output monitor is usually placed to monitor the output power of an output arm of the switch element which performs the switching function in the switch cells 120, 220, e.g., Mach-Zehnder interferometers. With the Mach-Zehnder interferometer as the switch element, the transfer function with current in and optical power out on each output port is intrinsically analog, but it performs a digital switching role using the closed-loop control assisted by the switch cell output monitors.

Optical input port monitors are used for optical inputs of the PIC, which can verify the existence or power level of incoming optical signals arriving at the PIC. This is used for system calibration and fault detection and for where line input fiber comes onto the die, or for where input fiber from Tx comes onto the die. Therefore, for the drop switch 100, there is usually an optical input port monitor for each optical line input port 108; for the add switch, there is usually an optical input port monitor for each input from the client transmitter Tx 216 and for each optical transit input port 218.

The last tap-monitor (or any intermediate tap-monitor) before each optical output of each PIC can also be used for optical power leveling, so that each optical output port has a desired optical power level relative to the other optical output ports.

In the embodiment illustrated by way of example in FIG. 1, the drop switch 110 includes a number of switch cell output monitors 122, each being used for closed-loop control of an associated photonic switch cell 120; and a number of optical input port monitors 124, each being used for verification of light power arriving at the drop switch. According to the embodiment, the plurality of switch cell output monitors 122 are physically laid out in their associated photonic switch cells 120, and the plurality of optical input port monitors 124 are physically laid out at associated optical input ports 108.

As apparent from the description, in conventional designs when the light direction is reversed for designing an add transponder aggregator, the physical layouts of tap-monitors, more specifically the physical layouts of the optical input port monitors and the switch cell output monitors would have to be changed.

In comparison, in the embodiment illustrated by way of example in FIG. 2, tap-monitors 222, 224 are physically laid out in the add switch 210 in the same manner as in the drop switch 110. But when performing the add role, each tap-monitor 222 is given the control role or function of a switch cell output monitor, which is done by setting the association of the respective tap-monitor 222 to its corresponding nearest upstream switch cell 220, shown by dotted line 230. Similarly, when performing the add role, each tap-monitor 224 is given the control role or function of an optical input port monitor, by setting the association of the respective tap-monitor 224 to its corresponding nearest upstream device, be it optical transit input port 218 or the transmitter Tx 216.

Accordingly, an add-drop switch 110, 210 is provided with the same physical layout of tap-monitors 122, 124, 222, 224, that can be used for either the add or drop role, where the functions or roles of the tap-monitors can be set or changed during network installation or during network reconfiguration. The add-drop switch 110, 210 includes a control circuit comprising a closed-loop control cell for each switch cell 120, 220, and an overall system state controller to perform monitoring and control of the state of every switch cell 120, 220 in the switch. The ability to set or change the association of tap-monitors 122, 124, 222, 224 to their respective functions or control roles is realized by a controller, control device, control means or other control implementation, e.g., a modification to the control circuit, in the add-drop switch 110, 210. For the purposes of this specification, the term "controller" will be used to encompass all control devices, control implementations, control means, be in hardware, software or firmware.

According to various embodiments, the controller (or control implementation) provides the capability to change the functions or control roles of the tap-monitors 122, 124, 222, 224 between the add and drop switches 110, 210. The changing of the control roles of the plurality of tap-monitors may include changing a switch cell output monitor from being associated with one switch cell to another switch cell, or switching one tap-monitor between being a switch cell output monitor and being an optical input port monitor. For the purposes of this specification, a control role of a tap-monitor includes the tap-monitor acting as a switch cell output monitor for a corresponding switch cell, or acting as an optical input port monitor for a corresponding optical line input port, optical transit input port or client input. The association of a tap-monitor with its corresponding control role includes feeding the tap-monitor output to the corresponding switch cell, optical line input port, optical transit input port or client input to complete the feedback loop.

Depending on how the transponder aggregator is constructed the controller or control implementation can be realized by one of two ways. In both ways, a global electrical switch is provided that is selectable between two states, one state for the add role, and the other state for the drop role. The control roles of the tap-monitors 122, 124, 222, 224 is in one embodiment a Boolean state, and the global electrical switch is provided for the whole circuit 110, 210.

If the control circuit is implemented using software or firmware in digital electronics, for example, by way of an external controller such as a field programmable gate array (FPGA), central processing unit (CPU), complex programmable logic device (CPLD) or other programmable circuit, the control implementation may be done by modifying a mapping or look-up table in the firmware or software in digital electronics that maps the tap-monitors 122, 124, 222, 224 to their respective control roles. An instruction on a digital controller may be sent to implement the change of control roles of the tap-monitors 122, 124, 222, 224.

If the control circuit is implemented using analog electronic feedback, then a smart pixel control circuit may be modified to connect current from the photodetector of the tap monitor 122, 124, 222, 224, or voltage from the transimpedance amplifier of the tap monitor, to a corresponding one of two possible feedback circuits.

In such embodiments, the control circuit may be a flip-chip attached smart pixel control chip made in e.g. complementary metal-oxide-semiconductor (CMOS). Each switch cell 120, 220 may have an associated CMOS micro-control cell, having the same area footprint as the switch cell and implemented on one or a few CMOS chips that are attached to the top or bottom surface of the photonic chip by means of die stacking technology (e.g. flip-chip technology or through substrate via technology). In this case, there is no firmware or software that can support a mapping table. Instead, the tap-monitor current or voltage is physically connected to the associated CMOS micro-control cell.

In one embodiment, a current-steering circuit is connected to the output of the photodetector of the tap-monitor. The current-steering circuit includes a current directing gate made of transistors, having one input from the tap-monitor and two outputs, one output being used when the design is implemented as an add switch circuit and the other output being used when the design is implemented as a drop switch circuit. A single selector electrode is connected in common to all current directing gates, and the state of the selector electrode determines whether the whole circuit functions as an add switch or as a drop switch.

Similarly in an alternative embodiment, a voltage-steering circuit is connected to the output of the photodetector electrical receiving amplifier, such as a transimpedance amplifier, to connect to two possible feedback circuits. A single selector electrode is connected in common to all voltage directing gates, and the state of the selector electrode determines whether the whole circuit functions as an add switch or as a drop switch.

In the embodiments as shown in FIGS. 1 and 2, each of the tap-monitors 122, 124, for the drop switch 110 are physically laid out within their associated switch cells 120 or at their associated optical input ports 108. In an alternative embodiment, each tap-monitors 222, 224 for the add switch 210 may be physically laid out within their associated switch cells 220 or at their associated optical input ports 118 and client inputs 116. In yet another alternative embodiment, tap-monitors 222, 224 may be physically laid out in some other manner, where they are not physically close to their associated switch cells, or associated optical input ports for either drop switch or add switch. It should be understood that various physical layouts of the tap-monitors become possible with the control implementation that is adapted to change the control roles of the tap-monitors.

According to the various embodiments described above, the add or drop role is set during network installation or reconfiguration. However, it should be appreciated that the design enables the circuit to be switched during operation from operating in one direction to operating in the other direction. Accordingly, the directionality (i.e. whether the transponder aggregator performs an add role or a drop role) may be changed during operation of the network, and the electrical selection may be reset. Switching direction during operation may involve physically exchanging the Tx and Rx equipment because the Tx function is different than the Rx function.

Figure 5:
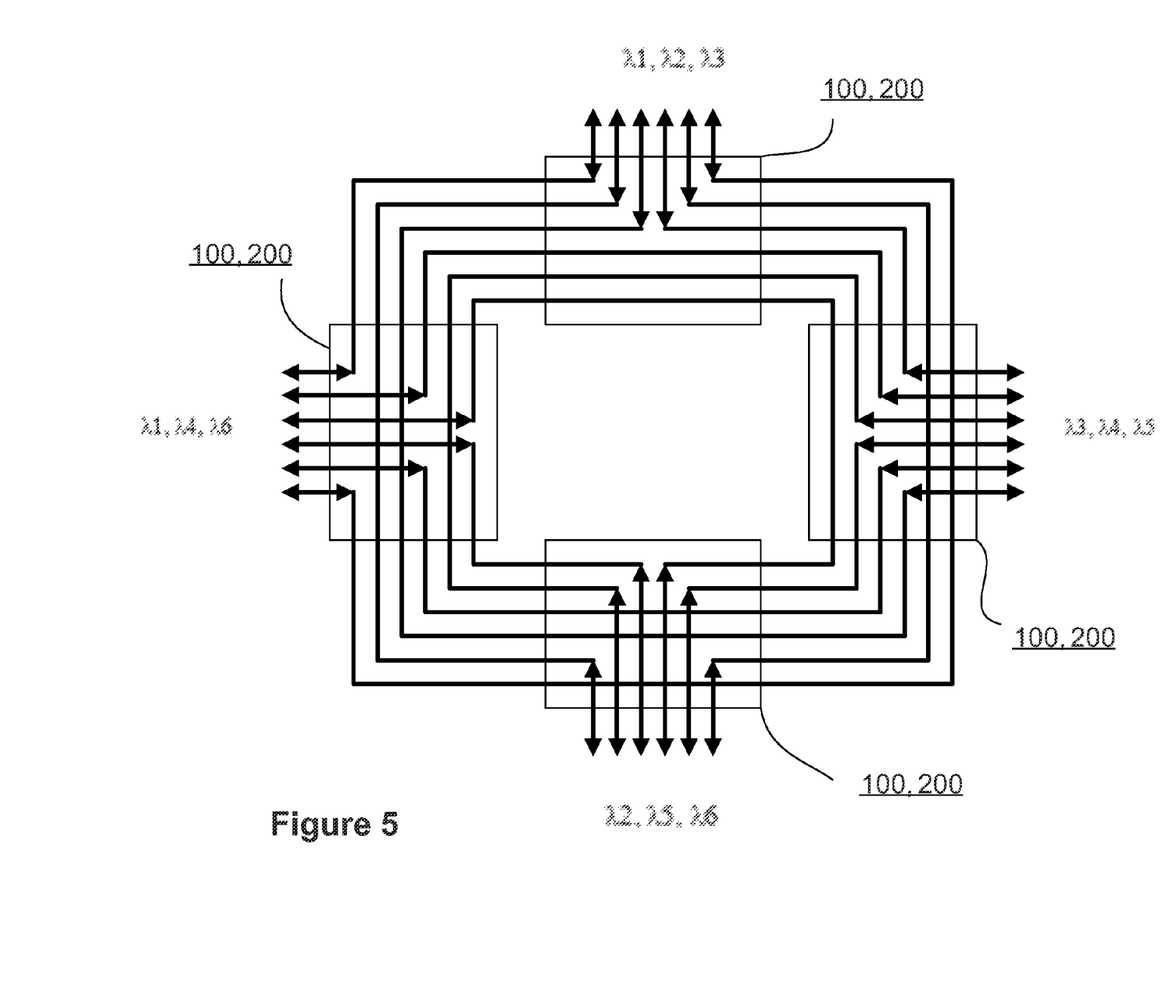
FIG. 5 illustrates a Dense Wavelength-Division Multiplexing (DWDM) ring, using the transponder aggregator according to one embodiment of the present invention.

FIG. 5 illustrates an DWDM ring showing a typical application of the transponder aggregator 100, 200, according to one embodiment of the present invention. Each transponder may connect banks of Rx and/or banks of Tx to WDM line fibers. While six wavelengths λ1-λ6 are illustrated in the example, it should be understood that the transponder aggregator is not limited by the number of the wavelengths or the number of inputs and outputs.

In a DWDM ring, each transponder aggregator 100, 200 is used only for a single direction (depending on whether it performs the add role or drop role), and not in both directions at the same time.

It should however be appreciated that the design can be modified such that different paths through the die can operate in different directions at the same time. The modified design can be used in a network structure where light in both directions shares one fiber, for example, in a PON or WDM PON network. In such applications, each switch cell only handles light from one direction at any given moment, and the switch cell does not share a lightpath of both directions.

According to the various embodiments described above, the number of tap-monitors are not increased compared to the conventional designs, but their control roles can be changed depending on the direction of the light.

In another less compact embodiment, separate backward-facing tap-monitors may be added at the other end of each switch cell (e.g., left end of switch cell in the embodiment of FIG. 1) or at the optical outputs of the switch circuit. Creating separate forward-facing tap-monitors and backward-facing tap-monitors, the same switch chip can perform both the add role and the drop role. The two photodetectors of the two tap-monitors can connect in parallel to one transimpedance amplifier, or can connect to different monitor circuits. The controller will be adapted to connect the correct output to the feedback circuit.

However, compared to the embodiments described above which do not increase the number of tap-monitors, this particular embodiment may result in an increase in chip area and in the number of electrical receiver circuits. As well, this embodiment may increase optical loss because each lightpath goes through double the number of tap-monitors, regardless of the direction of light propagation.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a CD-ROM, DVD, RAM, ROM, EPROM, Flash Memory or any suitable memory card or data-storage device. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), or equivalent.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A bidirectional optical tap-monitor for detecting an optical signal power carried by a through waveguide, the bidirectional optical tap-monitor comprising:
   a tap waveguide placed near the through waveguide for coupling a fraction of the optical signal power carried by the through waveguide, the tap waveguide including two ports at opposite ends of the tap waveguide; and
   a single waveguide-type photodetector for detecting the coupled fraction of the optical signal power, the waveguide-type photodetector including two ports that are connected respectively to the two ports of the tap waveguide,
   wherein when light travels through the through waveguide in one direction, the coupled fraction of the optical signal power is fed to the photodetector via one of the two ports of the tap waveguide, and when light travels through the through waveguide in the opposite direction, the coupled fraction of the optical signal power is fed to the photodetector via the other one of the two ports of the tap waveguide.

2. The optical tap-monitor according to claim 1, wherein the tap waveguide is a directional coupler.

3. The optical tap-monitor according to claim 1, wherein the photodetector absorbs light to suppress optical loop parasitics.

4. The optical tap-monitor according to claim 1, wherein the photodetector provides at least 40 dB optical absorption.

5. The optical tap-monitor according to claim 1, further including an electrical circuit to measure an output of the photodetector thereby providing a relative indication of a magnitude of the optical signal power.

6. The optical tap-monitor according to claim 1, further including a transimpedance amplifier.

7. An add-drop photonic chip configurable between an add role and a drop role for a transponder aggregator, the chip comprising:
 a plurality of photonic switch cells for collectively implementing switching functions for either an add transponder aggregator or a drop transponder aggregator; and
 a plurality of bidirectional tap-monitors for control of the plurality of photonic switch cells, wherein each bidirectional tap-monitor is adapted to detect an optical signal power carried by a through waveguide and includes:
 a tap waveguide for coupling a fraction of the optical signal power carried by the through waveguide, the tap waveguide including two ports at opposite ends of the tap waveguide; and
 a single waveguide-type photodetector for detecting the coupled fraction of the optical signal power, the photodetector including two ports that are connected respectively to the two ports of the tap waveguide,
 wherein when the plurality of photonic switch cells collectively implement switching functions for the add transponder aggregator, the coupled fraction of the optical signal power is fed to the photodetector via one of the two ports of the tap waveguide, and when the plurality of photonic switch cells collectively implement switching functions for the drop transponder aggregator, the coupled fraction of the optical signal power is fed to the photodetector via the other one of the two ports of the tap waveguide.

8. The add-drop photonic chip according to claim 7, wherein the plurality of tap-monitors include a plurality of switch cell output monitors, each being used for closed-loop control of an associated photonic switch cell.

9. The add-drop photonic chip according to claim 8, wherein the plurality of tap-monitors further include a plurality of optical input port monitors, each being used for verification of light power arriving at the add-drop photonic chip.

10. The add-drop photonic chip according to claim 9, wherein when the plurality of photonic switch cells collectively implement switching functions for the add transponder aggregator, the add-drop photonic chip further includes a plurality of optical input ports and client inputs, and the plurality of optical input port monitors are physically laid out at their associated optical input ports and client inputs.

11. The add-drop photonic chip according to claim 9, wherein when the plurality of photonic switch cells collectively implement switching functions for the drop transponder aggregator, the add-drop photonic chip further includes a plurality of optical input ports and the plurality of optical input port monitors are physically laid out at their associated optical input ports.

12. The add-drop photonic chip according to claim 8, wherein the plurality of switch cell output monitors are physically laid out in their associated photonic switch cells, when the plurality of photonic switch cells collectively implement switching functions for the add transponder aggregator.

13. The add-drop photonic chip according to claim 8, wherein the plurality of switch cell output monitors are physically laid out in their associated photonic switch cells, when the plurality of photonic switch cells collectively implement switching functions for the drop transponder aggregator.

* * * * *